United States Patent Office 2,831,419
Patented Apr. 22, 1958

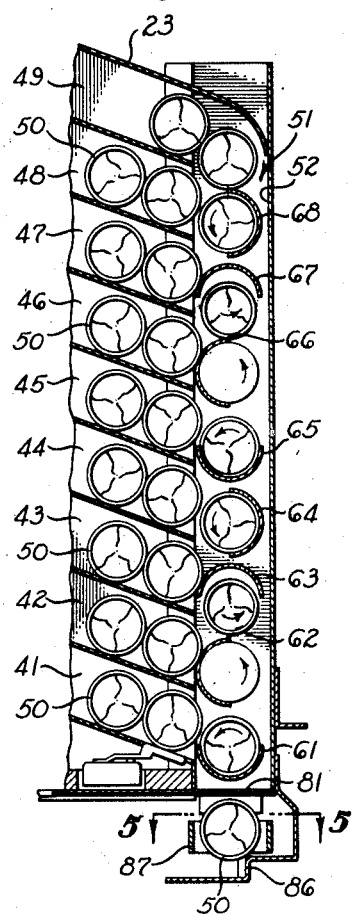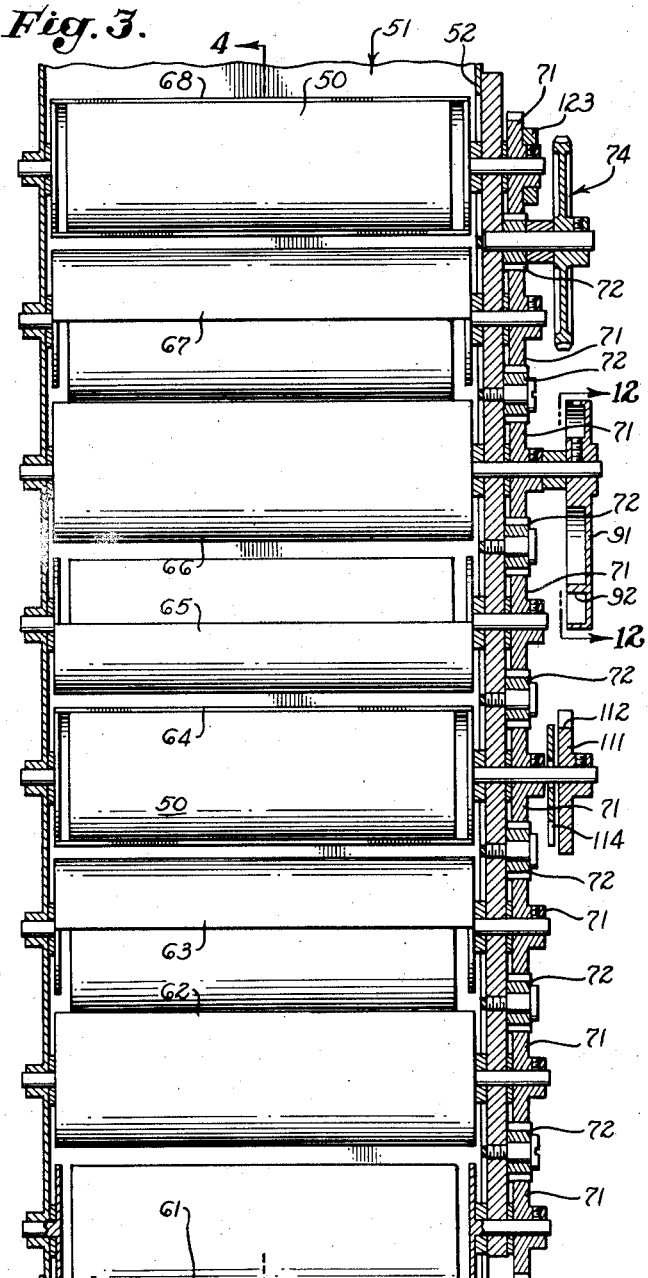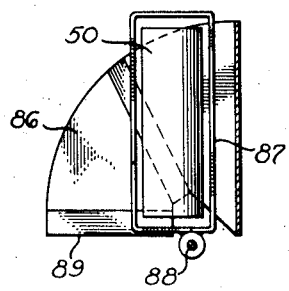

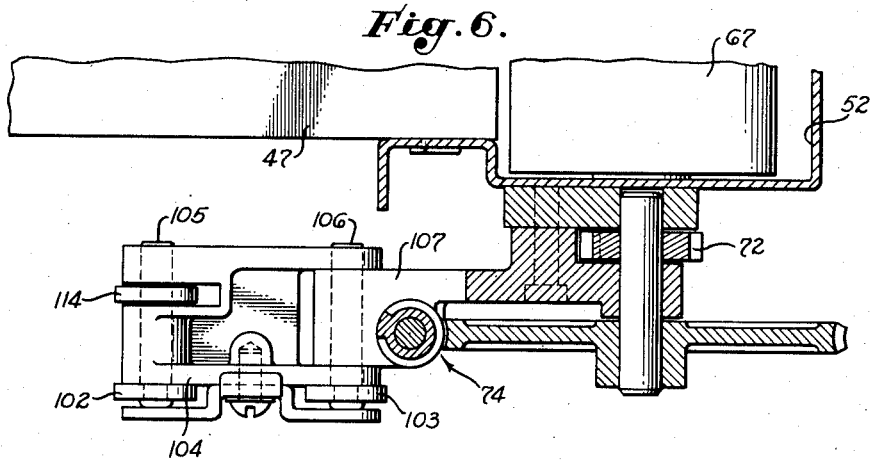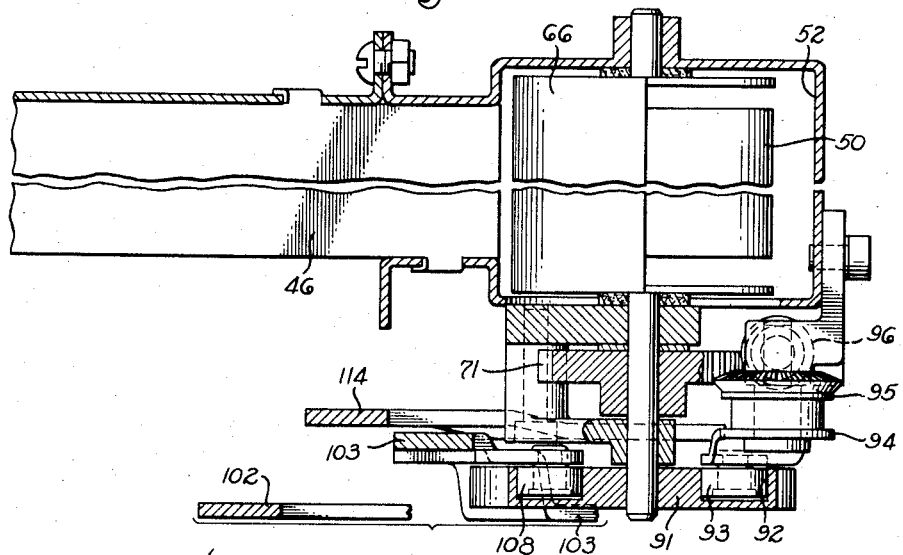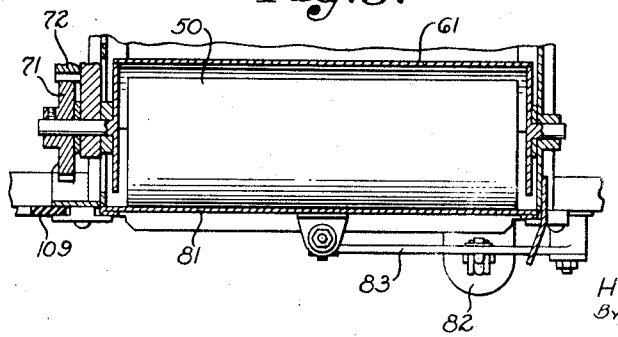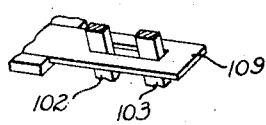
INVENTOR.
OTTO W. TIMM
BY HIS ATTORNEYS.
HARRIS, KIECH, FOSTER & HARRIS April 22, 1958
O. W. TIMM
2,831,419
DISPENSING MACHINE
Filed Jan. 21, 1952
6 Sheets-Sheet 5
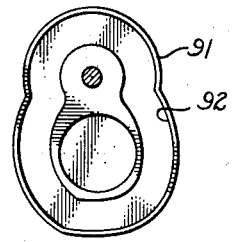
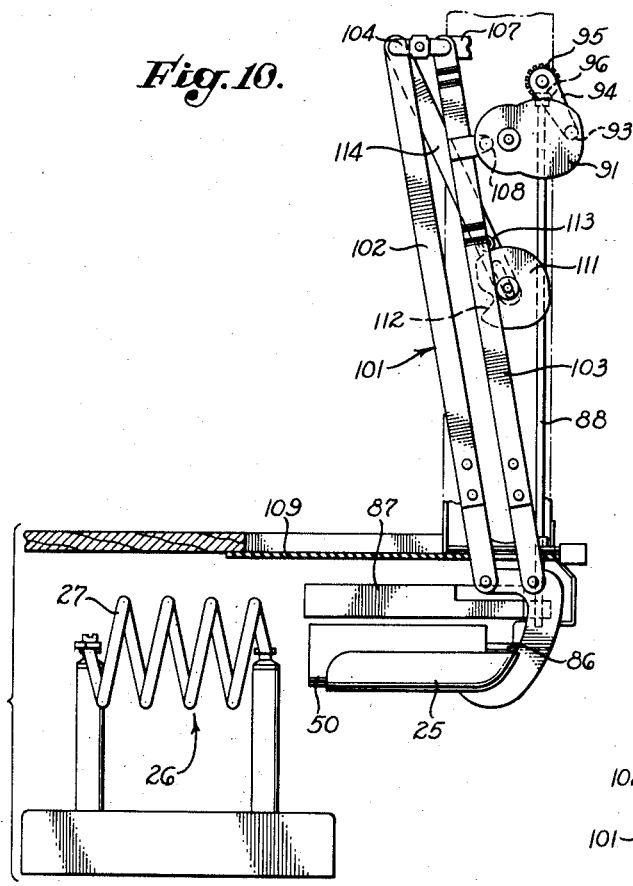
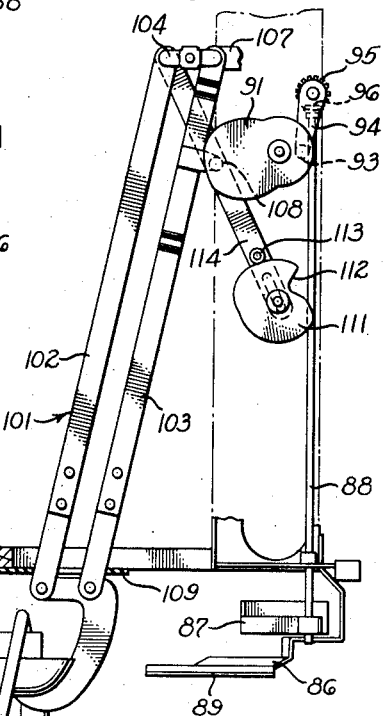
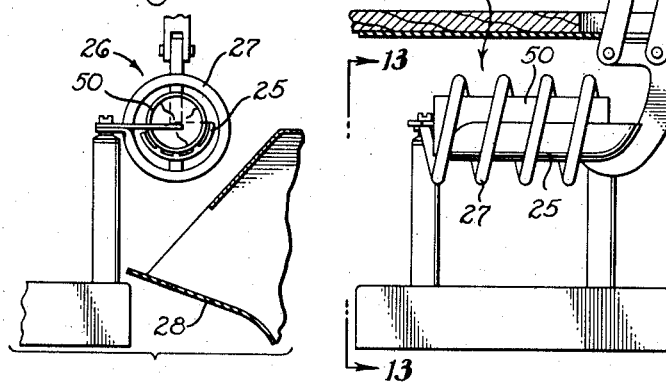
INVENTOR.
OTTO W. TIMM
BY HIS ATTORNEYS.
HARRIS, KIECH, FOSTER & HARRIS

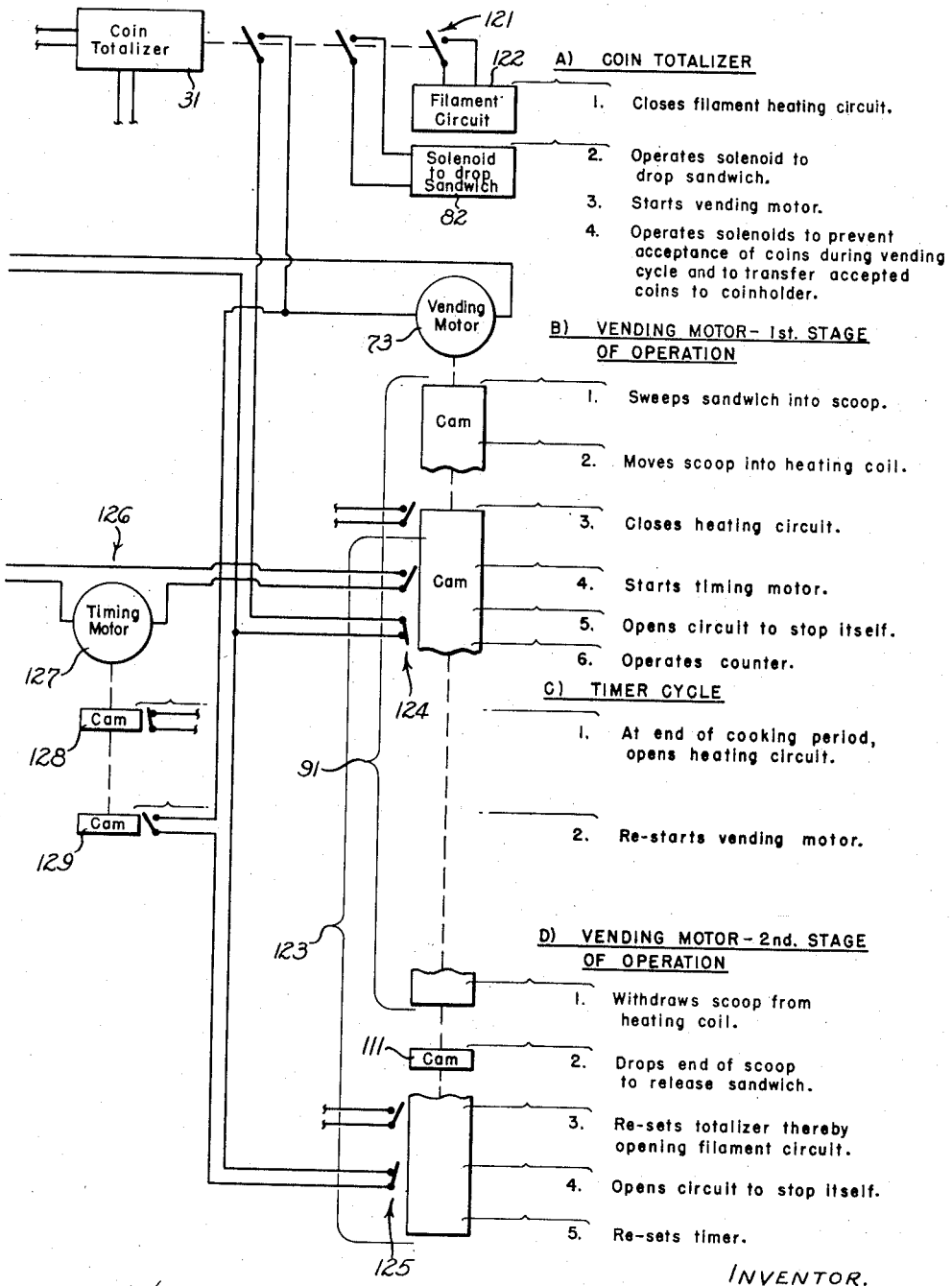

2,831,419

DISPENSING MACHINE

Otto W. Timm, Van Nuys, Calif., assignor, by mesne assignments, to International Glass Corp., a corporation of California Application January 21, 1952, Serial No. 267,453

3 Claims. (Cl. 99—357)

The present invention relates in general to dispensing machines and will be considered herein as embodied in a coin-operated vending machine for dispensing cooked articles of food, such as hot dogs, or other sandwiches.

A primary object of the invention is to provide a dispensing machine which maintains the articles in horizontal positions for virtually the entire period between the time that the articles are placed in the machine and the time that they are delivered, cooked, to the ultimate consumer. More particularly, an important object of the invention is to cook the articles in horizontal positions.

The advantage of the foregoing is that any liquid, or semiliquid, substances in the articles cannot leak out while the articles are in storage in the machine or while they are being cooked, or being transported from one element of the machine to another. Thus, any liquid, or semiliquid, substances in the articles, such as gravy, or cheese melted during the cooking process, are retained in their proper positions in the articles, which is an important feature.

Preferably, the articles are cooked electronically by inserting each article into a horizontal cooking coil to which a source of high-frequency alternating current is connected, the article within the coil becoming the core of the coil and the rapidly changing flux in the article generating sufficient heat to cook it in a short interval of time.

Another object is to provide a dispensing machine having a magazine in which the articles are stored in horizontal positions, having means for transporting each article in a horizontal position from the magazine to the horizontal cooking coil, wherein the article is cooked in a horizontal position, and having means for transporting the cooked article in substantially a horizontal position from the cooking coil to a point where it is accessible to the ultimate consumer.

Preferably, the hot dogs, or other articles to be cooked and dispensed, are placed in cylindrical containers so that they may roll freely, an important object of the invention being to provide a magazine in which a supply of the articles may be stored and which includes superimposed compartments each inclined downwardly toward a discharge end thereof so that the articles roll toward the discharge ends of the compartments under the influence of gravity as successive articles are removed from the compartments.

Another object is to provide a dispensing machine which includes means for discharging articles from the compartments of the magazine in sequence, beginning with the uppermost compartment, a related object being to provide means for lowering successive articles in a step-by-step manner so that articles may be discharged from the upper compartments of the magazine without dropping excessive distances.

Another object is to provide a lowering means which includes vertically-spaced, rotatable receptacles respectively registering with the discharge ends of successive ones of the inclined compartments, the receptacles being rotatable between operative and inoperative positions and being interconnected in such a way that alternate ones of the receptacles are in their upright positions while the intervening ones are in their inverted positions. With this arrangement, each article drops from an inverted receptacle to an upright receptacle, the receptacles being spaced apart relatively short distances so that the articles are handled gently in being lowered from the uppermost compartments of the magazine.

An important object is to provide a construction wherein the rotatable receptacles and the articles therein serve to block the escape of articles from each compartment until all of the articles in the compartment thereabove have been discharged. With this arrangement, the compartments are emptied from the top down.

Another object is to provide a transporting means for transporting each article from the magazine to the horizontal cooking coil, such transporting means being adapted to receive one article at a time from a discharge means adapted to discharge one article at a time from the magazine. An object in this connection is to provide a transporting means which includes a receptacle movable between an inoperative position spaced from the cooking coil and an operative position within the cooking coil, and which includes sweep means for transferring each article from the discharge means into the receptacle.

Another object is to provide a horizontal platform below the discharge means onto which each article discharged from the magazine by the discharge means drops, the sweep means being movable over this horizontal platform to roll or slide each article over the platform and over an edge thereof into the receptacle. A related object is to provide a sweep means comprising a rectangular frame which is open top and bottom and which is adapted to receive the article, the rectangular frame preferably being mounted for pivotal movement through an arc.

Another object is to provide means operatively interconnecting the receptacle and the sweep means of the transporting means and the receptacles of the lowering means for operating all of these elements in timed relation.

The foregoing objects and advantages of the present invention, together with numerous other objects and advantages thereof which will become apparent, may be attained with the exemplary embodiment of the invention which is described in detail hereinafter and which is illustrated in the accompanying drawings. Referring to the drawings:

Fig. 3 is an enlarged, fragmentary sectional view taken along the arrowed line 3—3 of Fig. 2;

Fig. 4 is a fragmentary sectional view on a reduced scale which is taken along the arrowed line 4—4 of Fig. 3;

Fig. 5 is a fragmentary sectional view taken along the arrowed line 5—5 of Fig. 4;

Figure 2:
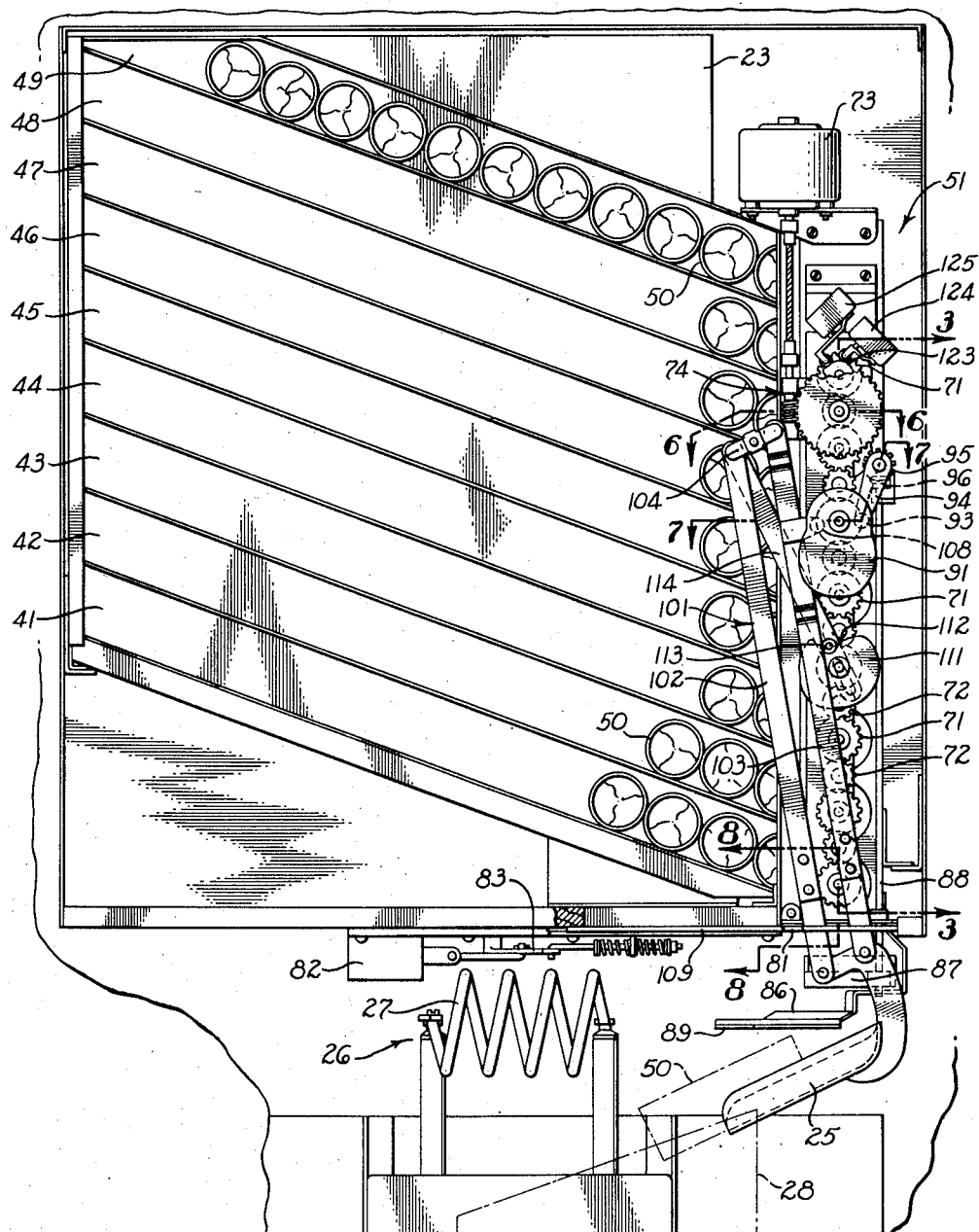
Fig. 2 is an enlarged, fragmentary sectional view taken in a plane behind the plane of Fig. 1.

Figs. 6, 7 and 8 are fragmentary sectional views on an enlarged scale which are taken along the arrowed lines 6—6, 7—7 and 8—8, respectively, of Fig. 2;

Fig. 9 is a fragmentary isometric view of a portion of the machine;

Figs. 10 and 11 are fragmentary views, partially in elevation and partially in section, illustrating the operation of portions of the machine;

Fig. 12 is a fragmentary sectional view taken along the arrowed line 12—12 of Fig. 3;

Fig. 13 is a fragmentary sectional view taken along the arrowed line 13—13 of Fig. 11; and Fig. 14 is a diagrammatic view illustrating the operation of the machine of the invention.

Figure 1:
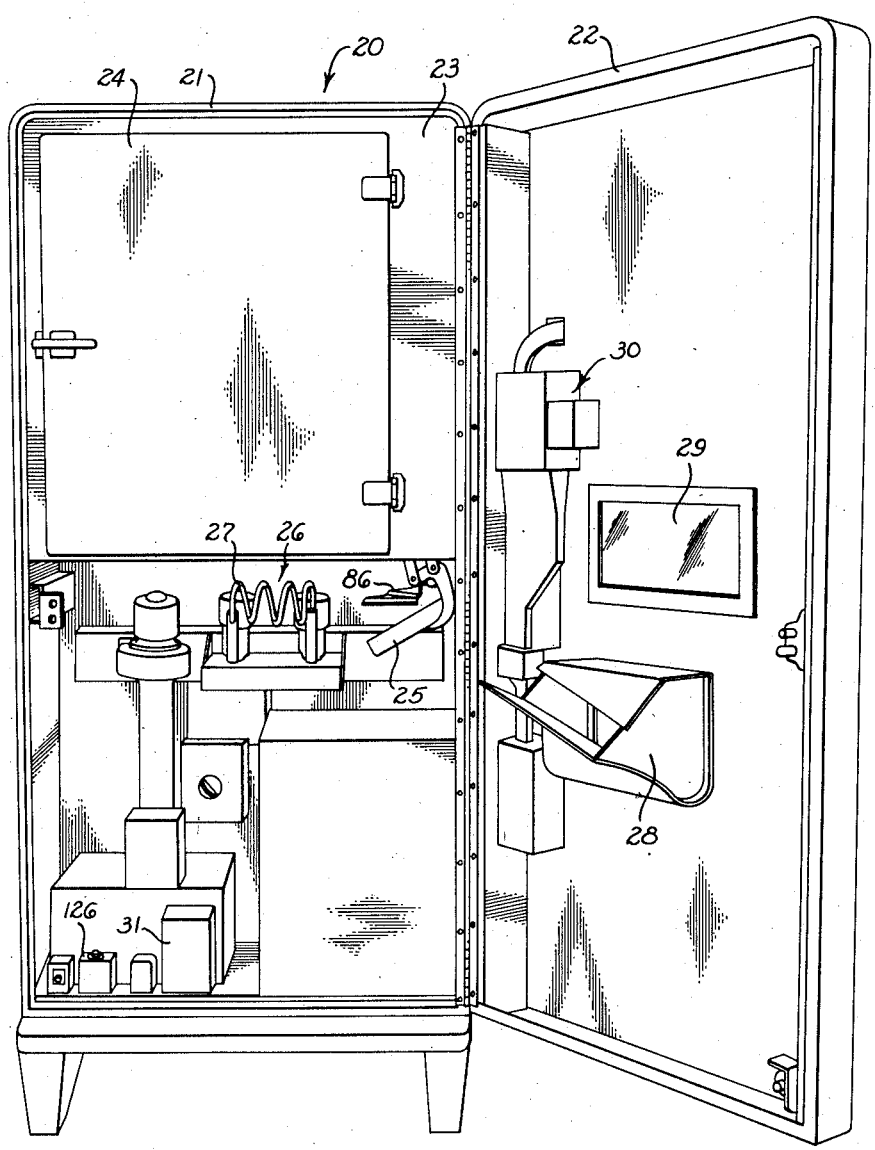
Fig. 1 is an isometric view of a dispensing machine which embodies the invention, the machine being shown with a door thereof open to reveal elements within the machine.

Referring first to Fig. 1 of the drawings, the dispensing machine of the invention illustrated therein is designated generally by the numeral 20 and includes a housing or cabinet 21 having a hinged door 22 which is preferably normally locked and which may be opened to permit access to the interior of the machine. Within the cabinet 21 is a magazine 23 in which articles to be dispensed may be stored, the magazine 23 preferably being refrigerated in a suitable manner, not shown, if perishable foodstuffs, such as hot dogs, or other sandwiches, are stored therein. Access to the magazine 23 may be had by way of a door 24. The machine 20 includes means, to be described hereinafter, for discharging successive articles from the magazine 23 into a receptacle 25, such as a scoop, this scoop being movable between an inoperative position wherein it is spaced from a cooking means 26 and an operative position wherein it is disposed within the cooking means. Preferably, the cooking means 26 is electronic to permit rapid cooking, the cooking means being shown as including a horizontal cooking coil 27 into which the article is moved by the scoop 25 when the latter moves into its operative position. The cooking coil 27 is connected to a suitable source of high-frequency alternating current, not specifically designated in the drawings, thereby cooking the article. After the article is cooked, the scoop 25 is moved to its inoperative position to withdraw the article from the cooking coil, and the scoop is tilted to dump the cooked article into a discharge chute 28, the latter being carried by the cabinet door 22 in the particular construction illustrated. The door 22 is provided with an opening therein through which the cooked article may be removed from the discharge chute 28, the door preferably also being provided with a window 29 therein through which the purchaser of the article may observe the cooking process. Also carried by the cabinet door 22 is a coin-receiving mechanism 30 of any suitable construction, the latter relaying impulses to a coin totalizer 31 as coins are dropped into the mechanism 30. When coins representing the purchase price of the cooked article have been dropped into the coin-receiving mechanism 30, the totalizer 31 sets the machine in operation, as will be discussed in detail hereinafter.

Referring particularly to Figs. 2 and 4 of the drawings, the magazine 23 includes a plurality of superimposed, inclined compartments, designated by the reference numerals 41 to 49. In view of the inclination of the compartments 41 to 49, articles stored therein tend to move downwardly toward the lower or discharge ends of the compartments under the influence of gravity, the articles preferably being disposed in cylindrical containers 50, of cardboard, for example, so that they readily roll downwardly toward the discharge ends of the compartments. Thus, whenever an article is discharged from the discharge end of one of the compartments 41 to 49, the remaining articles automatically roll downwardly one step, which is an important feature.

The dispensing machine 20 also includes means, designated generally by the numeral 51, for lowering successive articles in a step-by-step manner from the compartments 41 to 49 in sequence, beginning with the uppermost compartment 49. As best shown in Fig. 4 of the drawings, the discharge ends of the compartments 41 to 49 communicate with a generally vertical discharge chute 52, the lowering means 51 including a plurality of vertically-spaced, rotatable, hemicylindrical receptacles 61 to 68 disposed in the discharge chute 52 and respectively registering with the discharge ends of the compartments 41 to 48. If desired, another similar receptacle, not shown, may be disposed in registry with the compartment 49, but this is not necessary. The receptacles 61 to 68 are oriented as shown in Fig. 4, the receptacles being interconnected in such a way as to maintain this relationship.

An important feature of the invention is that the receptacles 61 to 68 and the articles therein act as valves which permit discharge of articles from the uppermost compartment 49 only, until such time as all of the articles have been discharged from this compartment. Thereafter, articles are discharged from the compartment 48 only, until all of the articles have been discharged therefrom, this process being repeated until all of the articles have been discharged from all of the compartments, the lowermost compartment 41 being the last to be emptied. As will be apparent from Fig. 4, so long as articles are in the uppermost compartment, no article can be discharged from the compartment 48 therebeneath, the receptacle 68 blocking discharge of any articles from the compartment 48 as long as it is in its inverted position and an article therein blocking discharge of articles from the compartment 48 when the receptacle 68 is in its upright position. Consequently, no articles can escape from the compartment 48 until all of the articles from the uppermost compartment 49 have passed the uppermost receptacle 68. Subsequently, articles may then be discharged from the compartment 48 until this compartment is empty, this process being repeated until all compartments have been emptied, the lowermost compartment 41 being the last to be emptied. This valve action of the receptacles 61 to 68 and/or the articles therein provides a systematic emptying of the compartments 41 to 49, which is an important feature of the invention.

As will be apparent, as the receptacles 61 to 68 are rotated, the articles are lowered downwardly through the discharge chute 52 in a step-by-step manner, each article dropped by one of the receptacles as it rotates to its inverted position falling but a short distance into the receptacle therebeneath. Thus, the articles are lowered from the uppermost compartments a step at a time to minimize jolting and jarring thereof, which is an important feature.

It might be well to point out at this stage that the tubular containers 50 containing the hot dogs, or other articles to be dispensed, are disposed in the compartments 41 to 49 horizontally and are lowered in a step-by-step manner by the lowering means 51 while in horizontal positions. This prevents any liquid, or semi-liquid, components of the articles from draining to one end, and also minimizes damage to the articles during dropping by the lowering means 51 since the article is much less likely to suffer damage if dropped on its side, as compared with endwise dropping. Storing and lowering the articles in horizontal positions represent important features of the invention, and the articles are preferably maintained in horizontal positions throughout the balance of the dispensing or vending cycle also, as will be discussed in more detail hereinafter.

Considering now the manner in which the receptacles 61 to 68 are rotated, each receptacle has a driving gear 71 connected thereto, as by being fixed on a shaft carrying the receptacle. These driving gears 71 are interconnected by intermediate idling gears 72, each idling gear 72 being meshed with two of the driving gears 71. With this interconnection between the receptacles 61 to 68, they all operate in timed relation and all rotate in the same direction to provide the valve action hereinbefore described.

The gear train interconnecting the receptacles 61 to 68 is driven by a dispensing or vending motor 73 through worm gearing 74 connected to one of the idling gears 72, Fig. 3. Thus, the vending motor 73 drives all of the receptacles 61 to 68 in unison.

As each article in its container 50 is dropped from the lowermost receptacle 61, it drops onto a gate 81 which closes the lower end of the discharge chute 52. As best shown in Figs. 2 and 8, the gate 81 is adapted to be retracted by a solenoid 82, the latter being connected to a pivoted arm 83 which, in turn, is pivotally connected to the gate. Thus, whenever the solenoid 82 is energized, the gate 81 is moved to its retracted position, the gate being returned to its extended position wherein it blocks the lower end of the discharge chute 52 by a suitable spring, not shown, which may be the return spring in the solenoid.

When the solenoid 82 is energized to retract the gate 81, if an article to be cooked is resting on the gate, it drops downwardly onto an arcuate platform or shelf 86 below the discharge means formed by the gate 81, the gate moving laterally relative to the tubular container in which the article is disposed so that the article remains horizontal as it drops. As best shown in Fig. 5 of the drawings, in addition to dropping onto the platform 86, the article in its tubular container 50 drops into a sweep means 87 which takes the form of a rectangular frame open at its top and bottom. This sweep means is rotatable about a vertical axis, being connected to a vertical shaft 88 which is rotated through an angle of approximately 90° in the particular construction illustrated. As the sweep means 87 is rotated or pivoted away from a position beneath the gate 81, it rolls or slides the article to an edge 89 of the platform 86, the article then dropping off the edge 89 of the platform into the scoop 25. The latter is positioned below the edge 89 of the platform 86 when in its inoperative position, the manner in which the scoop is moved between its operative and inoperative positions being discussed in detail hereinafter. Thus, the sweep means 87 serves to transfer each article from the magazine-discharge means formed by the gate 81 to the scoop 25, the article again being maintained in a horizontal position while it is being transferred. Preferably, the scoop 25 is disposed only slightly below the edge 89 of the platform 86 when in its inoperative position so that the article drops laterally only a short distance to minimize jarring and jolting, the scoop being horizontal when in its inoperative position so that the article is again maintained horizontal.

Considering the manner in which the sweep means 87 is actuated, a cam 91 is rigidly connected to one of the receptacles 61 to 68, as by being fixed on a shaft of such receptacle, attention being directed to Fig. 3 in this connection. As best shown in Fig. 12, the cam 91 has an irregular cam groove 92 in one face thereof, this cam groove receiving a cam follower 93, Figs. 2, 10 and 11, which is mounted on an arm 94. As will be apparent, as the receptacles 61 to 68 rotate through one complete revolution, the cam 91 rotates through one complete revolution to swing the arm 94 back and forth, this arm driving a bevel gear 95 which is meshed with a similar gear 96 on the upper end of the shaft 88. Thus, as the cam 91 rotates through one complete revolution, it causes the sweep means to move from a position beneath the gate 81 to a position beyond the edge 89 of the platform 86 and back to its original position beneath the gate 81, thereby completing one cycle of the movement of the sweep means 87.

Considering the manner in which the scoop 25 is moved between its operative and inoperative positions, the scoop is carried by a pivoted arm means 101 which includes two relatively movable arms 102 and 103 pivotally connected at spaced points to the scoop 25. The opposite ends of the arms 102 and 103 are pivotally interconnected by a link 104, this link being pivotally connected to the arms by pins 105 and 106, as best shown in Fig. 6 of the drawings. The pin 106 is connected to stationary structure 107 so that this pivot point of the arm 103 and the link 104 is stationary. The arm 103 carries a cam follower 108 which is disposed in the cam groove 92 in the cam 91 so that, as the cam 91 is rotated in the manner hereinbefore described, it swings the arm means back and forth to move the scoop 25 between its inoperative position, Fig. 10, and its operative position, Fig. 11, the scoop being disposed within the cooking coil 27 when in its operative position. The arms 102 and 103 extend through a slide 109, Figs. 2 and 9 to 11, which keeps the magazine 23 closed.

Since the cam 91 operates both the sweep means 87 and the scoop 25, it will be apparent that these elements operate in timed relation. As the cam 91 rotates, it first causes the sweep means 87 to roll or slide an article in its tubular container 50 over the platform 86 and into the scoop 25. Thereafter, continued rotation of the cam 91 causes the arm means 101 to swing the scoop into its operative position within the cooking coil 27. By the time the cam 91 completes one revolution, it has returned both the sweep means 87 and the scoop 25 to their original positions, i. e., it has returned the sweep means to its starting position beneath the gate 81 and has returned the scoop 25 to its inoperative position below the edge 89 of the platform 86.

After the scoop 25 has been returned to its inoperative position with the cooked article therein, the scoop is tilted downwardly to drop the cooked article into the discharge chute 28, from which it may be removed by the purchaser. In order to effect tilting of the scoop 25, as shown in Fig. 2, the arm 102 of the arm means 101 is caused to move downwardly relative to the arm 103. This is accomplished by a cam 111 having a notch 112 therein, the periphery of the cam being engageable by a cam follower 113 carried by a link 114 pivotally connected to the arm 102 and the link 104 by the pivot pin 105. The cam 111, as best shown in Fig. 3, is connected to one of the receptacles 61 to 68, as by being fixed on a shaft of such receptacle. Consequently, the tilting of the scoop is accomplished in timed relation with the movement of the scoop between its operative and inoperative positions and with the movement of the sweep means 87 over the platform 86, the cam 111 rotating into a position to present the notch 112 to the cam follower 113 after the scoop has been returned to its inoperative position. Thus, the cooked article carried by the scoop is dumped into the discharge chute 28 for removal by the purchaser. Preferably, the discharge chute 28 receives the cooked article in a horizontal position for the reasons hereinbefore discussed.

It will be noted that, throughout the storage and entire handling of each article, the article is maintained horizontal at all times except for the brief interval during which the article is in an inclined position in sliding from the scoop 25 into the discharge chute 28. Thus, any liquid, or semiliquid, components of the article are kept from draining toward one end thereof, which is an important feature. Also, any components which may be rendered liquid, or semiliquid, during cooking, such as cheese, for example, are kept from draining toward one end of the article during and after the cooking operation by maintaining the article horizontal.

The over-all operation of the invention will now be considered with reference to Fig. 14 of the drawings, which discloses the sequence of events in the operating cycle of the dispensing machine in diagrammatic form. When the operator has deposited coins totalling the purchase price of one article in the coin-receiving mechanism 30, the coil totalizer 31 is actuated in any suitable manner, well known in the art, and is illustrated as closing a gang 121 of switches. As clearly indicated in Fig. 14, actuation of the switch gang 121 by the totalizer 31 results in closure of a filament heating circuit 122 associated with the cooking coil 27, closure of the circuit leading to the solenoid 82 to produce retraction of the gate 81 to drop an article onto the platform 86, and closure of the circuit to the vending motor 73. The purpose of closing the filament heating circuit 122 at this stage is to ready the cooking means 26 for operation at a later stage in the operating cycle of the dispensing machine 20. Also, other solenoids, not shown, are energized for the purposes indicated.

When the vending motor is energized in the foregoing manner, it drives the cams 91 and 111 and a cam 123, see Fig. 2 also, for actuating two multiple-switch units 124 and 125. The cams 91 and 111 are driven through the intervening connections hereinbefore described and the cam 123 is mounted on the shaft for one of the rotatable receptacles 61 to 68, as best shown in Fig. 3. Thus, the cams 91, 111 and 123 operate in timed relation.

As indicated in Fig. 14, the operation of the vending motor 73 is divided into two stages, and the first event in the first stage of the operating cycle of the vending motor is the sweeping of the sandwich, or other article, into the scoop 25 by the sweep means 87, this being accomplished by the cam 91. The next event is the movement of the scoop 25 from its inoperative position to its operative position within the cooking coil 26, this also being accomplished by the cam 91. The next event is that the cam 123 actuates the switch unit 124, which does three things, viz., closes the circuit to the cooking coil 27, closes the circuit to a timer 126, and opens the vending motor circuit to stop the vending motor. This completes the first stage of the operating cycle of the vending motor 73.

It should be noted that while the foregoing events in the operating cycle of the motor are occurring, the rotatable receptacles 61 to 68 are also being rotated to advance the articles in the discharge cute 52 downwardly on step, this occurring since the receptacles 61 to 68 and the cams 91, 111 and 123 are all operatively interconnected in the manner hereinbefore discussed.

After the timer 126, which may be regarded as a motor 127 driving cams 128 and 129, is energized, it opens the circuit to the cooking means 26 after a predetermined interval and re-energizes the vending motor 73. In the particular construction illustrated for the timer 126, this would occur after one revolution of the cams 128 and 129, such cams being adapted to actuate suitable switches shown thereadjacent. However, in actual practice, timers other than motor-driven cams may be employed if desired.

Re-energization of the vending motor 73 initiates the second and last stage of its operating cycle. The continued rotation of the cam 91 results in movement of the scoop 25 from its operating position within the cooking coil 27 to its inoperative position. Subsequently, the notch 112 in the cam 111 is presented to the cam follower 113 to tilt the scoop 25 downwardly, whereupon the cooked article slides off the scoop 25 into the discharge chute 28 for removal by the purchaser. Thereafter, the cam 123 actuates the switch unit 125, which resets the coin totalizer 31 and which opens the circuit to the vending motor 73 to stop the vending motor. Resetting of the coin totalizer 31 preferably opens the filament heating circuit 122 also. At this point, the operating cycle of the dispensing machine is completed and all is in readiness for the next operating cycle, which is initiated whenever coins of the proper total value are dropped into the coin-receiving mechanism 30.

Although I have disclosed an exemplary embodiment of the invention herein for purposes of illustration, it will be understood that various changes, modifications and substitutions may be incorporated in the exemplary embodiment disclosed without departing from the spirit of the invention.

I claim as my invention:

1. In a machine for dispensing articles, the combination of: a magazine adapted to store articles in horizontal positions; discharge means for discharging successive articles from said magazine in horizontal positions; a horizontal cooking coil; receptacle means adapted to receive successive articles from said discharge means for carrying successive articles in horizontal positions from said discharge means into said horizontal cooking coil for cooking and for subsequently carrying the articles out of said horizontal cooking coil, said receptacle means including a receptacle adapted to receive an article from said discharge means, said receptacle being movable from a position spaced from said cooking coil into a position within said coil and back to said position spaced from said coil; sweep means movable between said discharge means and said position of said receptacle spaced from said cooking coil for transferring successive articles from said discharge means to said receptacle; and means for moving said receptacle and said sweep means in timed relation.

2. In a machine for dispensing articles, the combination of: a magazine; cooking means; means for dispensing successive articles from said magazine; a receptacle adapted to receive an article from said dispensing means; pivoted arm means movable through an arc and connected to said receptacle to move it between positions respectively adjacent said dispensing means and said cooking means; and cam means operatively connected to said arm means and to said dispensing means for so moving said arm means.

3. In a machine for dispensing cooked articles, the combination of: a magazine for articles to be dispensed and cooked; dispensing means for dispensing articles from said magazine seriatim; means for energizing said dispensing means; cooking means for cooking an article; timing means for timing the cooking of an article; means actuable by said dispensing means for transporting an article to be cooked from said dispensing means to said cooking means; means subsequently actuable by said cooking means for energizing said timing means and for de-energizing said dispensing means; means actuable by said timing means at the end of a predetermined interval of time sufficient to cook an article for re-energizing said dispensing means and for de-energizing said timing means; means actuable by said dispensing means upon re-energization thereof for transporting the cooked article out of said cooking means; and means subsequently actuable by said dispensing means for de-energizing said dispensing means.

References Cited in the file of this patent

UNITED STATES PATENTS

| | | |
|---|---|---|
| 1,460,140 | Penso | June 26, 1923 |
| 1,543,069 | Ellis | June 23, 1925 |
| 1,716,266 | Flamm | June 4, 1929 |
| 1,855,441 | Crouse | Apr. 26, 1932 |
| 1,897,072 | Parks et al. | Feb. 14, 1933 |
| 1,910,682 | Dumas | May 23, 1933 |
| 1,921,173 | Maur | Aug. 8, 1933 |
| 2,076,091 | O'Neill | Apr. 6, 1937 |
| 2,129,897 | Williams | Sept. 13, 1938 |
| 2,211,511 | Melzer | Aug. 13, 1940 |
| 2,243,895 | Brown | June 3, 1941 |
| 2,256,976 | Ford | Sept. 23, 1941 |
| 2,363,724 | Ford | Nov. 28, 1944 |
| 2,384,863 | Warner | Sept. 18, 1945 |
| 2,387,817 | Wales | Oct. 30, 1945 |
| 2,390,277 | Simpkins | Dec. 4, 1945 |
| 2,392,511 | Thompson et al. | Jan. 8, 1946 |
| 2,453,280 | Stewart | Nov. 9, 1948 |
| 2,531,238 | Tandler et al. | Nov. 21, 1950 |
| 2,589,626 | Paul | Mar. 18, 1952 |
| 2,630,062 | Litt | Mar. 3, 1953 |